United States Patent

[11] 3,601,984

[72] Inventor Richard K. Davis
     Roanoke, Va.
[21] Appl. No. 869,538
[22] Filed Oct. 27, 1969
[45] Patented Aug. 31, 1971
[73] Assignee General Electric Company

[54] TEMPERATURE RATE CONTROL SYSTEM
     5 Claims, 2 Drawing Figs.
[52] U.S. Cl. ................................................ 60/39.28,
                                                        60/39.14
[51] Int. Cl. ................................................ F02c 9/08
[50] Field of Search ..................................... 60/39.28 T

[56] References Cited
        UNITED STATES PATENTS
2,971,337  2/1961  Wintrode .................. 60/243 X
3,082,954  3/1963  Offner ..................... 60/39.28 X
3,295,316  1/1967  Beatrice ................... 60/39.28
3,520,133  7/1970  Loft ....................... 60/39.28 X
3,226,558  12/1965 Walker .................... 415/15 X
3,291,146  12/1966 Walker .................... 415/17 X Primary Examiner—Clarence R. Gordon
Attorneys—John B. Sponsler, Gerald R. Woods, James C. Davis, Frank L. Neuhauser, Oscar B. Waddell, Joseph B. Forman and Arnold E. Renner ABSTRACT: A temperature rate control system for a gas turbine having sensors in the path of the exhaust gasses which produce an electrical signal proportional to temperature. A reference circuit provides a signal proportional to maximum allowable temperature which opposes the feedback signal at a summing junction. A third signal applied to the summing junction in opposition to the reference signal and varying toward zero as a function of time results in the summing junction output signal which varies the turbine fuel input inversely whereby the temperature increase rate of the turbine is held to a predetermined value.

PATENTED AUG 31 1971　　3,601,984

INVENTOR.
RICHARD K. DAVIS

3,601,984

TEMPERATURE RATE CONTROL SYSTEM

BACKGROUND OF THE INVENTION

To obtain the greatest efficiency of the gas turbine, it is desirable to operate with the temperature of the gases entering the turbine section as high as possible. However, in order to operate within design stress limitations of the turbine parts, there is a maximum allowable temperature which should not be exceeded. Thus, a temperature control system is required which will override the speed or the load control of the turbine should the turbine inlet temperature exceed a preset limit. Since it is impractical to measure turbine inlet temperature directly, the temperature control system is designed to control the turbine inlet temperature indirectly, by controlling exhaust temperature. During normal steady state operation of the gas turbine up to 100 percent of turbine speed, exhaust temperature is held at an optimum value by the fuel level control function. During the starting sequence of the turbine, the temperature control is an integral part of the starting function. In the starting sequence when the turbine is fired, the flame detectors initiate a timing period during which the temperature of the turbine is gradually increased to its final running temperature. In prior art the control circuitry which performs this time function includes a motor operated rheostat or hydraulic function which gradually moves through a predetermined number of steps whereby the fuel applied o the turbine is controlled as a function of time by means of a rheostat or hydraulic system or some other mechanical means. The adjustment of the upper and lower limits of fuel level applied to the turbine is generally a mechanical adjustment within the control and usually difficult to perform. The rate at which the temperature is allowed to increase over the time period is generally not adjustable due to predetermined motor speed in the rheostat and hence, is difficult to alter.

SUMMARY OF THE INVENTION

To overcome these difficulties the present invention provides for a control wherein a variable reference signal is tested against a feedback signal representing the temperature of the exhaust gas of the turbine. The reference signal being adjustable as a function of time causes a controlled allowable temperature increase within easily adjustable limits to occur over a predetermined time period. This time period is adjustable without affecting either the upper or lower limits of temperature set by the control.

DETAILED DESCRIPTION

Figure 1:
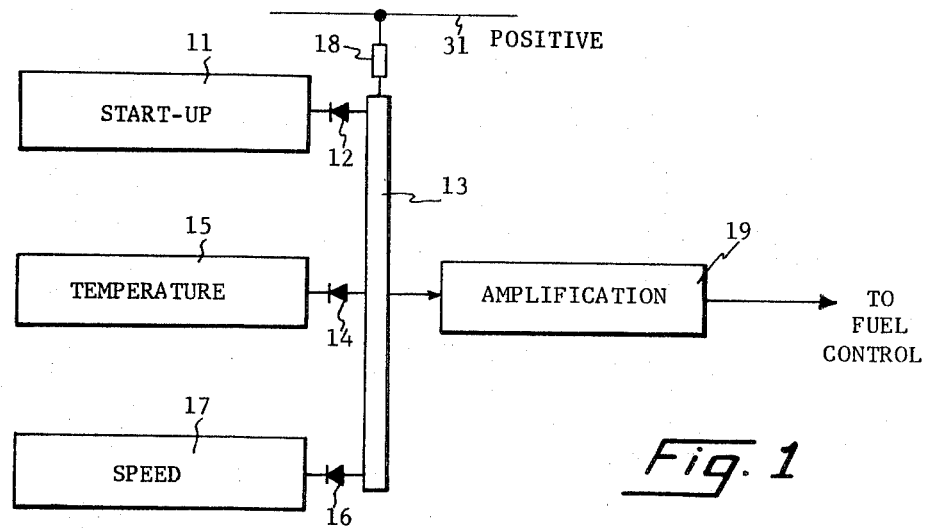
FIG. 1 shows the temperature control in relation to other functional control used in turbine fuel application.

Refer now to FIG. 1 wherein the control system for running a gas turbine engine has three main parameters of control: (1) startup, (2) speed and (3) temperature. Into these three parameters may be fed a number of other parameters, such as acceleration, as well as separate input signals such as the load input on the turbine. The figure is a block diagram showing these three main parameters wherein the startup control 11 has an output connected to minimum value gate 13 through diode 12. The temperature control 15 similarly has its output connected to minimum value gate 13 through diode 14; and the speed control 17, which includes acceleration control, also has its output connected to minimum value gate 13 through diode 16. The minimum value gate provides an input signal to the amplification circuitry 19 which in turn has an output connected to the fuel control circuitry (not shown) of the gas turbine. The temperature control is an intricate part of the entire turbine control and therefore must be shown in conjunction with the other two major parameters, startup and speed control. The function of the startup control in the initial phase of the startup of the turbine is to withhold fuel from the turbine until a predetermined firing speed has been reached; at that point the startup control provides a signal which initiates the firing of the fuel. Immediately upon detection of the flame, the fuel level input is adjusted automatically for a warmup period wherein the turbine is gradually brought up to temperature in order to avoid a thermal shock to the hot gas path parts. At the end of the warmup period, the startup control initiates an accelerate period which causes the fuel control to provide more fuel to the gas turbine. The gas turbine continues to accelerate with the increase of fuel supplied thereto until the rate of temperature increase intercepted by a ramp rate of allowable temperature rise which is a preset value allowing for a predetermined increase in temperature per unit length of time of the exhaust gasses of the turbine, the rate of which is a predetermined value for bringing the gas turbine from the warmup temperature level to maximum temperature level. Since a gas turbine efficiency increases with speed, the gas turbine begins to accelerate faster and acceleration control will assume control of the turbine causing fuel consumption to be cut back. Thus, the speed of the turbine will increase at the rate allowed by the acceleration control. When the operating speed has been reached, the speed control assumes responsibility of running the turbine. Generally, the turbine is provided with a set of magnetic pickup units which are mounted on the shaft and provides a pulse train having a frequency of pulses which is proportional to the speed of the turbine. An analog voltage signal provides the reference signal against which the magnetic pickup signal is tested. When the reference input cancels the feedback input, in other words, when the resultant of the two signals is zero, the machine is running 100 percent of reference speed. The third main parameter, the temperature control, has the purpose of limiting the startup fuel input so that operating temperatures of the gas turbine are maintained at safe values, using exhaust temperature as a prime input signal. The temperature control provides an overriding signal such that temperature increase of the exhaust gasses may, for example, increase at not more than 5° per second. If then fuel input is at a rate whereby the temperature increase of the exhaust gasses will exceed this limit, the temperature control will override all of the other portions of the turbine control and limit the fuel input to the turbine.

Figure 2:
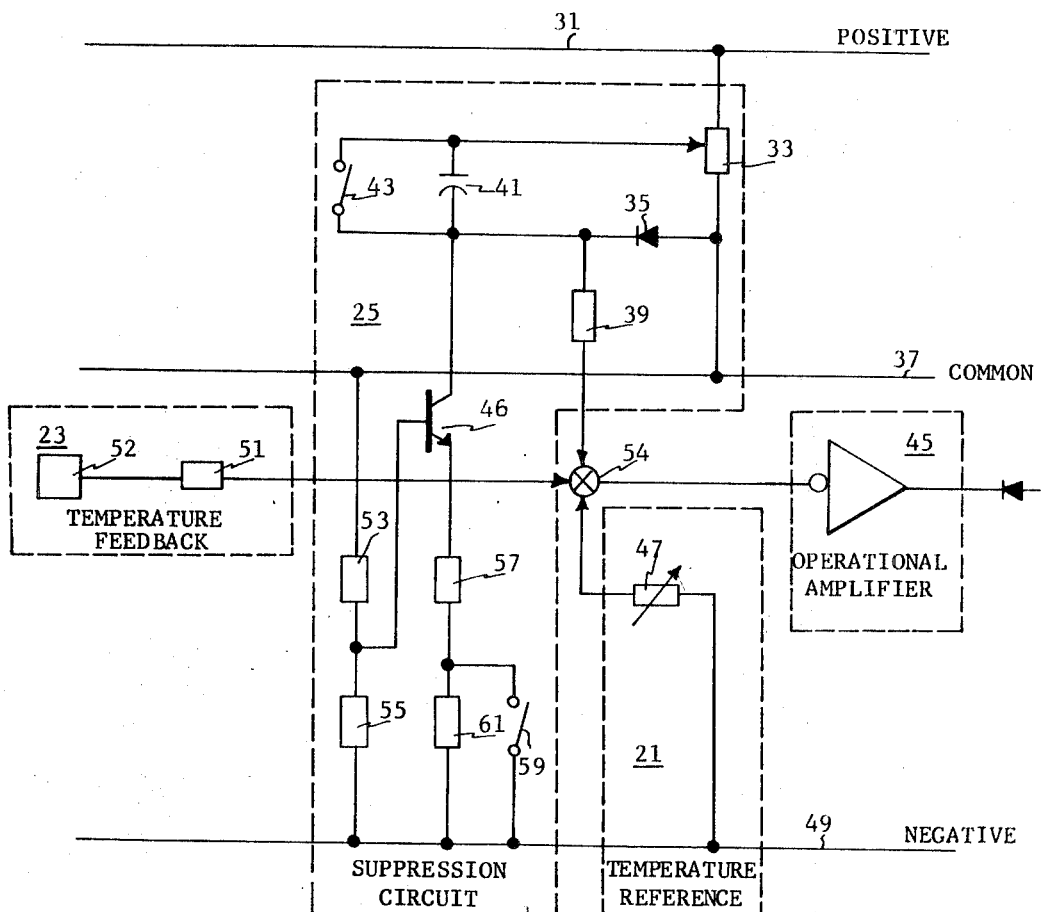
FIG. 2 shows the temperature rate control having a suppression circuit included for controlled startup of the turbine.

Referring now to FIG. 2 the temperature control circuit is divided in three major functions, a temperature reference circuit 21, a temperature feedback circuit 23 and a suppression circuit 25. The output signals of each of these divisions is applied to a summing junction 54 wherein the output signals are algebraically added to form the input of an operational amplifier 45 which in turn directs control circuitry of the fuel pump for the gas turbine (not shown). The performance of the operational amplifier is well known to those skilled in the art, hence only the symbolic representative thereof is shown.

The temperature reference circuit 21 includes a variable resistance 47 which on one side connects to the negative bus 49 and on the other side is connected to summing junction 54.

The temperature feedback circuit 23 receives a signal from temperature sensor 52 and applies this signal through resistor 51 to summing junction 54.

The suppression circuit 25 consists of a potentiometer 33 connected at one end to positive bus 31. At the other end, potentiometer 33 connects to the common bus 37 and to the anode of diode 35. The slider connection of potentiometer 33 feeds current to one side of capacitor 41 and through switch 43 to the other side of the capacitor 41, the cathode of diode 35, the collector of transistor 46 and through resistor 39 to summing junction 54. The emitter of transistor 46 connects through resistor 57 to switch 59 and through resistor 61 to the negative bus 49. Switch 59 connects to negative bus 49. The common bus 37 connects to the base of transistor 46 through resistor 53 and is connected through resistor 55 to the negative bus 49. Switches 43 and 59 are symbolic and may be any circuit closing device such as relays or transistor switches depending on the requirements of the application of the circuit.

The operation of the temperature control circuit without the suppression circuit 25 provides that the reference circuit 21 produces a negative signal which is applied to summing junction 54. This signal opposes the positive temperature feedback circuit 23 at summing junction 54. When the reference signal exceeds the feedback, the operational amplifying circuit 45 has a large positive output, causing the turbine to run at a speed determined by the speed control circuit 17. If the temperature feedback signal is more positive than the temperature reference signal due to excessive heat of the exhaust gasses, the summing junction 54 tends to become more positive which due to the inverting characteristics of the operational amplifier 45 causes a more negative signal to be produced thereby, which when applied to the fuel control (not shown) causes a reduction in fuel supply and temperature of the turbine. If the signal from reference circuit 21 is such that the summing junction become more negative, the resultant output signal of the operational amplifier 45 will be more positive causing increased fuel supply which in turn allows an increase in temperature of the turbine. The minimum value gate in FIG. 1 provides means for allowing that function which has the lowest output signal to assume control. The gate normally has a positive polarity through a connection to the positive bus 31 through resistor 18. If excessive temperature causes the output of the temperature control 15 to become more negative, current will flow from the minimum value gate 13 through diode 14 into the temperature control 15, thereby diverting some of the current which would normally be directed through the amplification function 19 to the fuel control (not shown).

With temperature control 25 in FIG. 2 in the circuit, at startup of the turbine, switch 43 of the suppression circuit 25 is closed causing a positive voltage from the voltage dividing potentiometer 33 to be applied through resistor 39 to the summing junction 54. This causes the summing junction 54 to tend to assume a positive polarity, resulting in a more negative output from the operational amplifier 45. This results in a suppressed allowable temperature. At the time the turbine is fired, switch 43 is opened and capacitor 41 which up to this moment was discharged begins to charge negatively through a constant current source consisting of resistors 61 and 57 and transistor 46 at a predetermined rate. This rate may be changed by closing switch 59 whereby the effect of resistor 61 is removed from the circuit. As the capacitor 41 charges, the voltage level at the cathode of diode 35 is reduced linearly toward zero due to the constant current source characteristics of transistor 46. The summing junction tends to become more negative, which in turn causes the output of the operational amplifier 45 to become more positive, resulting in increased fuel supply and a corresponding increase in allowable turbine temperature. When the capacitor 41 is fully charged, the turbine temperature limit will be determined by the combination of the negative output signal of the temperature reference circuit 21 and the positive output signal of the temperature feedback circuit at summing junction 54. The gas turbine thus has a starting cycle which provides minimum startup time with a minimum of temperature shock. Temperature rate may be allowed to increase by reducing the resistance in the capacitor charging path, resulting from the closing of switch 59. This allows the capacitor 41 to charge at a faster rate, causing the bias current at the summing junction to reduce at a faster rate, which in turn provides positive going signal to the fuel control thereby allowing fuel to be applied to the turbine at a faster rate.

Adjustment of potentiometer 47 in the temperature reference circuit 21 will change the level of negative current introduced to summing junction 54 thus changing the level of positive voltage from the temperature feedback circuit 23 which is required to overcome this and thereby changing the upper temperature limit of the turbine, without changing the rate of temperature increase set by suppression circuit 25. Similarly, adjustment of potentiometer 33 of the suppression circuit 25 will change the lower limit of the temperature suppression by changing the initial voltage condition of capacitor 41, without changing the rate of charge thereof and as a consequence without changing the rate of temperature increase of the turbine.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A gas turbine fuel control system including means for producing a control signal operable to control the temperature increase rate of the turbine comprising:
   a. first circuit means for producing a feedback signal proportional to turbine exhaust gas temperature;
   b. second circuit means for providing a limit signal representative of the maximum allowable exhaust gas temperature;
   c. means to govern the rate of rise of exhaust gas temperature including third circuit means operable to generate a time varying reference signal; and
   d. means to sum said feedback, limit and reference signals and to produce a control signal representative of permissible turbine temperature.

2. The invention in accordance with claim 1 in which the time varying reference signal varies linearly with respect to time from a predetermined maximum value towards zero.

3. The invention in accordance with claim 1 including means to vary the maximum value of said reference signal without varying the rate at which said reference signal varies.

4. The invention in accordance with claim 1 including additional means to change the rate at which said reference signal varies independently without changing the maximum value of said signal.

5. The invention in accordance with claim 4 in which said additional means comprises a series arrangement including a capacitor, a semiconductor device and a plurality of resistors and further including means to selectively render a portion of said resistors ineffective.